United States Patent [19]

Yokogawa

[11] Patent Number: 5,034,938
[45] Date of Patent: Jul. 23, 1991

[54] OPTICAL DISC RECORDING AND PLAYING APPARATUS

[75] Inventor: Fumihiko Yokogawa, Saitama, Japan
[73] Assignee: Pioneer Electronic Corporation, Tokyo, Japan
[21] Appl. No.: 386,369
[22] Filed: Jul. 28, 1989
[30] Foreign Application Priority Data
Dec. 29, 1988 [JP] Japan ................................ 63-333039
[51] Int. Cl.[5] .............................................. G11B 7/00
[52] U.S. Cl. ................................................ 369/44.26
[58] Field of Search .................... 369/44.25, 44.26, 47, 369/109

[56] References Cited
U.S. PATENT DOCUMENTS
4,761,775 8/1988 Murakami ........................ 369/44.26

Primary Examiner—Robert L. Richardson
Attorney, Agent, or Firm—Fleit, Jacobson, Cohn, Price, Holman & Stern

[57] ABSTRACT

An optical disc recording and playing apparatus records a video format signal on an optical disc on which an address signal is recorded in the form of prepits, while controlling the rotation of the optical disc on the basis of a phase difference between a synchronizing signal in the video format signal to be recorded and the address signal read-out from the optical disc, and reproduces the recorded video format signal. During the playing operation the apparatus generates a synchronizing signal which is synchronized with the reproduced video format signal and the generated synchronizing signal is outputted in place of the video format signal for the period of sections of the video format signal corresponding to the address signal. With this feature, generation of disturbances in the reproduced picture is surely prevented.

4 Claims, 3 Drawing Sheets

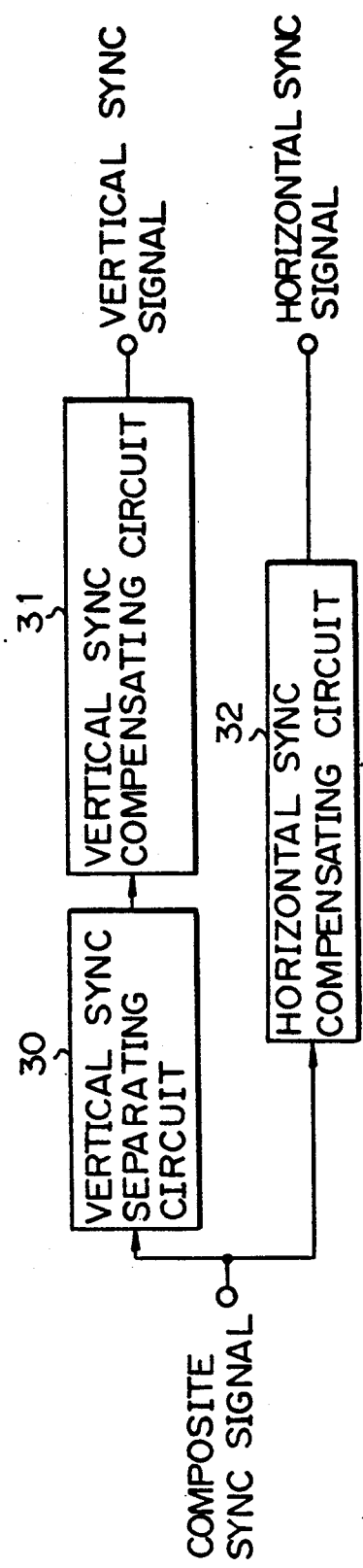
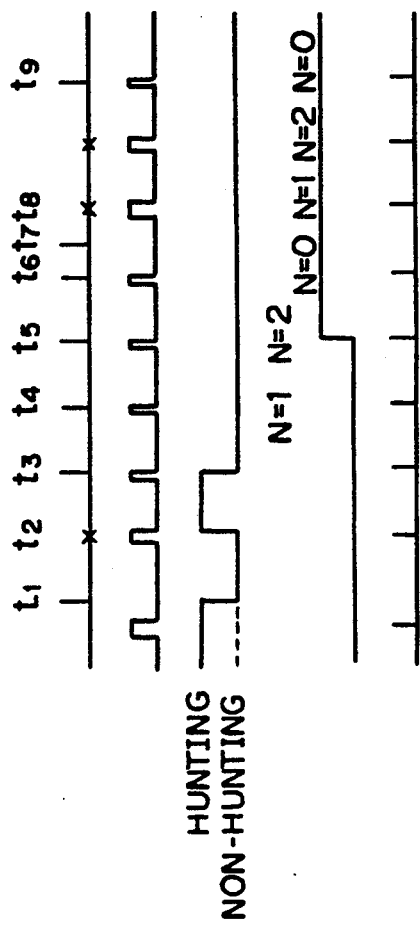

OPTICAL DISC RECORDING AND PLAYING APPARATUS

BACKGROUND OF THE INVENTION

1. Field of the Invention

The present invention relates to an optical disc recording and playing apparatus, and more specifically to a recording and playing apparatus for recording a video signal including synchronizing signals such as the so-called vertical and horizontal sync signals on an optical disc on which an address signal is previously recorded in the form of prepits, and for playing back the optical disc subsequently.

2. Description of Background Information

A recording and playing apparatus has been proposed in which an FM-modulated video format signal is recorded on an optical DRAW disc in the form of a file, so that reproduction of pictures with motion or still-pictures becomes possible. In the case of such a recording and playing apparatus, an address signal is previously recorded on the disc in the form of prepits for the purpose of the management of files. At the time of recording of the video format signal an address signal corresponding to the pre-address-pits is detected from the read-out RF signal from the disc, and the speed of rotation of the disc is controlled (time base control) by using the phase difference between the detected address signal and the vertical sync signal contained in the video format signal to be recorded, whereby a magneto-optical recording is performed so that correspondency between one frame of the video format signal and one track on the disc is accomplished. In order to prevent adverse effects of the pre-address-pits on the video signal, the time base control is performed in such a manner that the pre-address-pits are positioned in a corresponding area in the vertical blanking section. However, in the case of this recording system, the sync signal of the video format signal is recorded on the position of the pre-address-pits. In the case of such an arrangement that the pre-address-pits and the sync signal are recorded to overlap each other, the sync signal in the reproduced video format signal is disturbed during the reproduction, giving rise to disturbances in the reproduced picture.

OBJECT AND SUMMARY OF THE INVENTION

The present invention has been made in view of the above-described point and an object of the present invention is to provide an optical disc recording and playing apparatus in which the disturbance in the reproduced picture is eliminated in the case where the pre-address-pits and the sync signal in the video format signal are recorded to overlap each other.

In the optical disc recording and playing apparatus according to the present invention, an optical disc on which an address signal is previously recorded in the form of prepits, the video format signal is recorded while rotation of the optical disc is controlled by using the phase difference between the sync signal in the video format signal to be recorded and the address signal read-out from the optical disc. At the time of playback, a sync signal is generated in synchronism with the reproduced video format signal obtained by demodulating a signal read-out from the optical disc and sections of the video format signal corresponding to the above-mentioned recorded address signal are determined, and the generated sync signal is outputted instead of the reproduced video format signal for the sections of the video format signal corresponding to the recorded address signal.

BRIEF DESCRIPTION OF THE DRAWINGS

FIG. 2 is a block diagram showing an example of the sync separating and compensating circuit shown in FIG. 1;

FIGS. 4A through 4F are timing charts showing the operation of the circuit shown in FIG. 3.

DETAILED DESCRIPTION OF THE PREFERRED EMBODIMENT

The embodiment of the present invention will be explained hereinafter with reference to the accompanying drawings.

Figure 1:
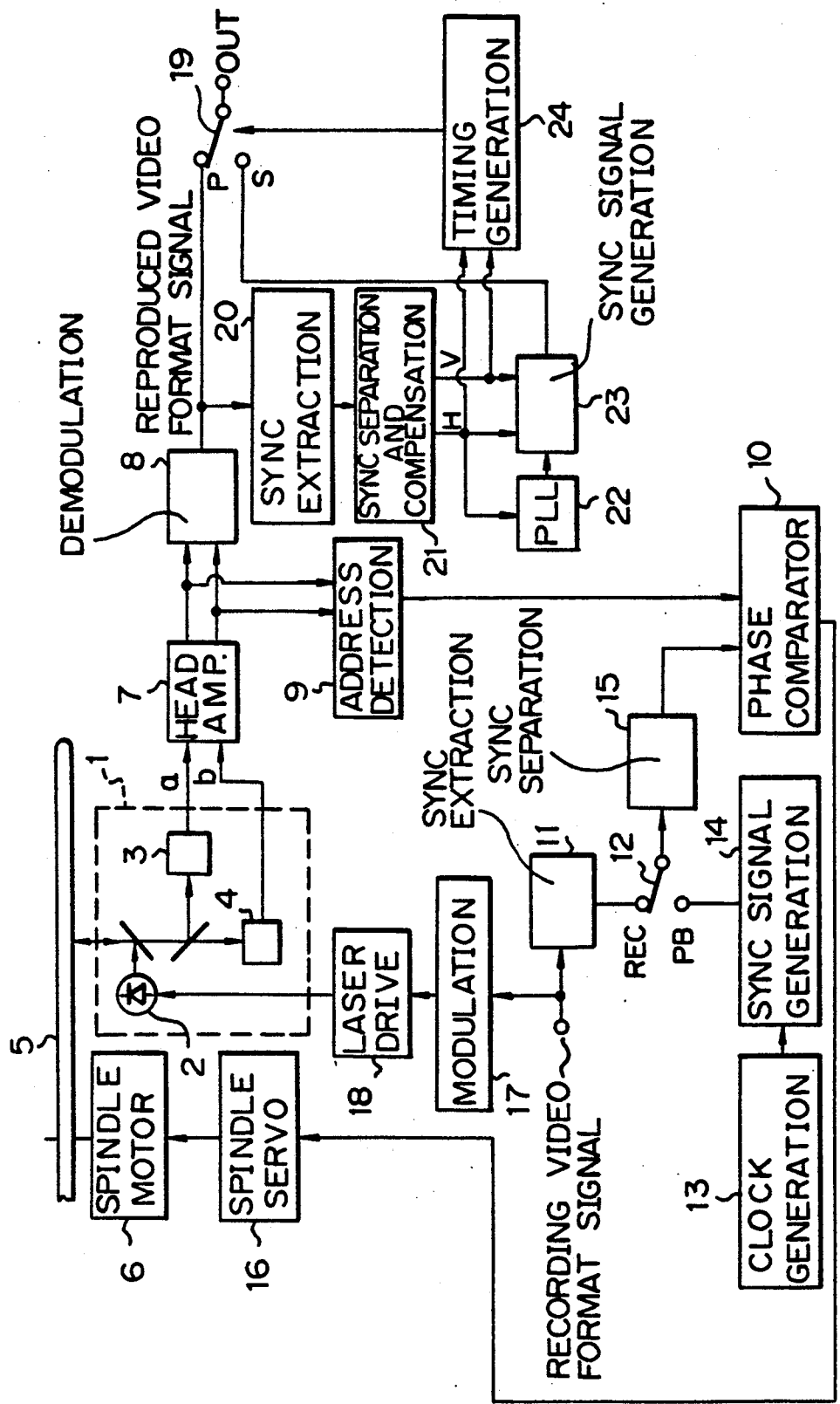
FIG. 1 is a block diagram of an embodiment of the recording and playing apparatus according to the present invention.

As shown in FIG. 1 illustrating the embodiment of the present invention, a magneto-optical pickup 1 incorporates therein a semiconductor laser 2 as a light source, and photo detector elements 3 and 4 that receive lights of both channels of a differential optical system and perform a photoelectric conversion operation. The photo detector elements 3 and 4 are provided for detecting, for instance, a laser beam emitted by a semiconductor laser 2 and reflected by the recording surface of a disc 5, respectively through an analyzer. One of the photo detector elements 3 and 4 is arranged to detect a component of the Kerr rotation angle in a positive direction and the other is arranged to detect a component of the Kerr rotation angle in a negative direction. Rotation of the disc 5 is performed by a spindle motor 6.

Although not illustrated in FIG. 1, the pickup 1 also incorporates a focus actuator and a tracking actuator. These two actuators are respectively driven by a focus servo circuit and a tracking servo circuit. With the operation of these actuators, focus servo circuit and tracking servo circuit, the laser beam emitted from the semiconductor laser 2 is accurately focused on the recording surface of the disc 5, forming a beam spot. This beam spot is relatively moved with respect to the disc along a pregroove, as a result of the rotation of the disc 5.

Output signals a and b of the photo detector elements 3 and 4 are applied to a demodulation circuit 8 and an address detection circuit 9 through a head amplifier 7. The demodulation circuit 8 includes a subtraction circuit which subtracts one of the output signals a and b of the photo detector elements 3 and 4 from the other. A differential signal (a−b) from this subtraction circuit is derived as a read-out RF signal based on the information recorded by the magneto-optical recording, and a reproduced video format signal is produced by the FM demodulation of the read-out RF signal. The address detection circuit 9 is constructed as an adder for adding the output signals a and b of the photo detector elements 3 and 4 with each other, and its output summation signal (a+b) is derived as address information that is previously recorded as the pre-address-pits. The address information signal is supplied to a phase comparator 10 at one input terminal thereof. At the other input terminal of the phase comparator 10, there is supplied a vertical sync signal separated from the video format signal to be recorded during the recording mode (REC), and the vertical sync signal generated on the basis of the clock signal during the playback mode (PB). More specifically, the composite sync signal extracted from the recording video format signal in a sync signal extracting circuit 11 is supplied to one REC of stationary contacts of a changeover switch 12, and a composite sync signal generated on the basis of the clock pulse at a sync signal generation circuit 14 is supplied to the other one PB of the stationary contacts of the change-over switch 12. In response to a switching control signal supplied from a controller (not shown) depending on the operational modes, i.e. the recording mode REC and the playback mode PB, the either one of the composite sync signals is selected at the change-over switch, and the vertical sync signal is separated from the selected composite sync signal at a sync signal separating circuit 15, and supplied to the other one of the input terminals of the phase comparator circuit 10. The phase comparator circuit 10 detects the phase difference between one of the vertical sync signals depending on the operating mode and the address information signal, and supplies it to a spindle servo circuit 16. The spindle servo circuit 16 performs the control of the spindle motor 6 in response to this phase difference signal.

In the recording mode, the video format signal to be recorded is supplied to a modulation circuit 17 where the vide format signal is processed by the FM modulation operation. FM signal outputted by the modulation circuit 17 is supplied to a laser driving circuit 18, so that the power of the laser beam from the semiconductor laser 2 in the pickup 1 is varied in response to the FM signal, to perform the magneto-optical recording operation.

In the playback mode, the reproduced video format signal obtained by the FM demodulation process in the demodulation circuit 8 is supplied to one p of stationary contacts of a change-over switch 19, and also supplied to the sync extracting circuit 20 in which the composite sync signal is extracted. The reproduced composite sync signal which has been extracted is then supplied to a sync separation and compensation circuit 21, where the reproduced composite sync signal is separated into a reproduced vertical sync signal (V) to which a drop-out compensation has been effected, and a reproduced horizontal sync signal (H). As illustrated in FIG. 2, the sync separation and compensation circuit 21 consists of a vertical sync separating circuit 30 which separates the vertical sync signal from the reproduced composite sync signal, a vertical sync compensation circuit 31 which performs the drop-out compensation of the separated vertical sync signal and outputs the same as the reproduced vertical sync signal, a horizontal sync compensating circuit 32 which performs the drop-out compensation of the horizontal sync signal in the reproduced composite sync signal and outputs the same as the reproduced horizontal sync signal. The vertical sync separating circuit 30 is configured to separate the vertical sync signal from the composite sync signal by detecting that a wide pulse width of vertical equivalent pulses. The construction and function of the vertical and horizontal sync compensating circuits will be describe later.

The reproduced horizontal sync signal is supplied to a PLL circuit 22, a sync signal generating circuit 23, a timing generation circuit 24, and the reproduced vertical sync signal is supplied to the sync signal generating circuit 23 and the timing generation circuit 24. The PLL circuit 22 generates a playback clock pulse signal on the basis of the reproduced horizontal sync signal and supplies it to the sync signal generating circuit 23. The sync signal generating circuit 23 is configured to generate the composite sync signal synchronized with the reproduced video format signal on the basis of the playback clock pulse signal and the reproduced horizontal and vertical sync signals. This composite sync signal is supplied to the aforementioned other stationary contact b of the change-over switch 19.

The timing generation circuit 24 is configured to detect the sections in which the address information is obtained on the basis of the horizontal sync signal and the vertical sync signal, i.e. the sections of the video format signal corresponding to recording portions of the address information (vertical blanking periods), and to generate a timing signal consisting of pulses each of which is present during the period of each detected section. The timing signal is used as the switch control signal of the above-described change-over switch 19, and to control the movable contact of the change-over switch 19 which is normally positioned at the stationary contact p, so that it is positioned at the stationary contact s during the period of the detected sections.

In this way, the video format signal is recorded on a optical disc on which the address signals is recorded in the form of prepits, while the rotation of the disc is controlled on the basis of the phase difference between the vertical sync signal in the recording video format signal and the address signal read-out from the disc. At the reproduction, the composite sync signal synchronized with the reproduced video format signal is generated, and the sections of the video format signal corresponding to the recorded address information are detected. During the period of the detected sections corresponding to the recorded address information, the generated composite sync signal is outputted in place of the reproduced video format signal. With this feature, even if the sync signal sections of the reproduced video format signal are disturbed by the pre-address-pits, a composite sync signal synchronized with the reproduced video format signal is generated in the period of these sections. Thus, the problem of the disturbance in the reproduced pictures caused by the presence of pre-address-pits will be obviated.

Figure 3:
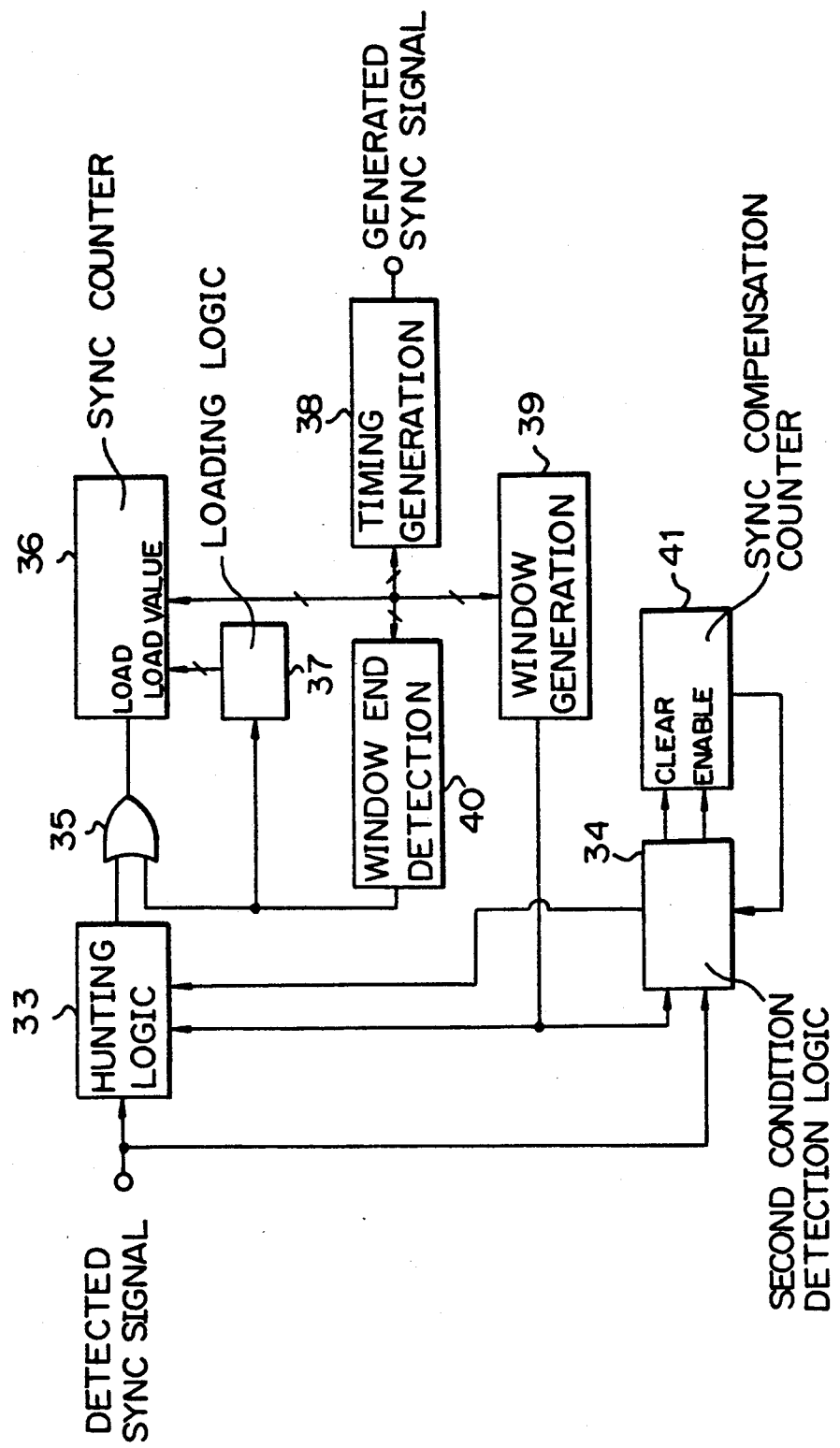
FIG. 3 is a block diagram showing an example of the vertical and horizontal sync compensation circuit shown in FIG. 2.

Now, the construction and operation of the vertical and horizontal sync compensation circuits 31 and 32 shown in FIG. 2 will be explained. FIG. 3 is a block diagram of an example of the construction of these circuits 31 and 32, and the circuit shown in this figure is commonly usable to both of the vertical and horizontal sync compensation circuits 31 and 32. In the figure, the vertical sync signal separated from the reproduced composite sync signal or the horizontal sync signal in the reproduced composite sync signal is respectively supplied to a hunting logic circuit 33 and the sync condition detection logic circuit 34. The hunting logic circuit 33 is operative to judge whether the operation of the apparatus is in a hunting mode for the lock-in of the synchronization or in a non-hunting mode, on the basis of the presence or absence of input of the sync signal and a sync flag which is supplied from the sync condition detection logic circuit 34. When the detected sync signal is supplied to the hunting logic circuit 33 in the hunting mode, the detected sync signal is supplied to the load (LOAD) input of a sync counter 36 through the hunting logic circuit 33 and an OR gate 35. By the application of the signal at the load input, a load value set in a loading logic circuit 37 is loaded in the sync counter 36, at the same time the sync counter 36 starts counting operation at a periodic rate of an internal clock.

On the basis of the count value of the sync counter 36, generation of the sync signal in a timing generation circuit 38, generation of window pulse signal having a predetermined pulse width in a window generation circuit 39, and detection of the window end, i.e, the trailing edge of the window pulse, in a window end detection circuit 40 are performed respectively. Detection output signal of the window end detection circuit 40 is supplied to a load input of the sync counter 36 through the OR gate circuit 35, and to a trigger input terminal of the loading logic circuit 37 at the same time. In the loading logic circuit 37, a predetermined loading value is set in response to the detection output of the window end detection circuit 40.

The sync condition detection logic circuit 34 is provided for detecting whether o not the system is in the synchronized condition on the basis of the count value of the sync compensation counter 41. In the sync condition detection logic circuit 34, a sync detection logic circuit is configured to perform operations of, in the asynchronous condition, making the sync compensation counter 41 "Count Enable" when the detected sync signal is inputted in the period of the window pulse outputted from the window generation circuit 39, making the sync flag to be at "H" level, i.e. the level indicating the synchronizing condition, when the count value N of the counter 41 reaches a predetermined value ("2" for example), and subsequently clearing the sync compensation counter 41 if the detected sync signal is inputted in the window pulse, further, in the sync condition, making the sync compensation counter 41 "Count Enable" if the detected sync signal is not inputted in the period of the window pulse, and making the sync flag to the "L" level indicating out of synchronism if the count value has reached a predetermined value (for example "4").

The operation of the circuit explained above will be described with reference to timing charts of FIGS. 4A through 4F of the accompanying drawings wherein FIG. 4A shows the detected sync signal, FIG. 4B shows the window pulse, FIG. 4C shows the mode of the hunting logic circuit 33, FIG. 4D shows the compensation count number, FIG. 4E shows the sync flag, and FIG. 4F shows the generated sync signal, respectively.

At first, when the sync flag is in the "L" level, i.e. the detected sync signal is not inputted in the asynchronous state, the hunting logic circuit 33 stays in the hunting mode (FIG. 4C). If the detected sync signal is inputted in the hunting mode (FIG. 4A, at a time point $t_1$), the operation of the apparatus enters in the non-hunting mode. At this instant, the inputted detected sync signal is supplied to the load input terminal of the sync counter 36 through the hunting logic circuit 33 and the OR gate circuit 35. In consequence, the sync counter 36 starts increment from the loaded value at a rate determined by the internal clock at the same time as the load value set in the loading logic circuit 37 is loaded therein. When the count value of the sync counter 36 has reached a target value, the window pulse is generated in the window generation circuit 39 (FIG. 4B, at time point $t_2$). The pulse width of the window pulse in this instant is determined to be in a range of pulse width of the sync signal $\pm \alpha$ clock pulse width.

If the detected sync signal is not inputted in the period of the window pulse, the hunting logic circuit 33 returns to the hunting mode again, and it waits the arrival of the next detected sync signal. When the next detected sync signal is inputted (FIG. 4C, at time point $t_3$), the hunting logic circuit 33 again enters in the non-hunting mode. If a detected sync signal is inputted in the period of the window pulse in the non-hunting mode (at time point $t_4$), the sync condition detection logic circuit 34 makes the sync compensation counter 41 to be "Count Enable". As a result, the count value of the sync compensation counter 41 is increased by one (FIG. 4D), and it performs the counting operation at the rate determined by the internal clock. When the count value N of this counter has reached a value 2 (N=2) at time point $t_5$, that is, when the detected sync signal is successively inputted twice at intervals of a predetermined duration, the sync condition detection logic circuit 34 detects this condition, making the sync flag "H" level, to judge the synchronizing condition (FIG. 4E).

Subsequently, if the detected sync signal is inputted in the period of the window pulse (at time point $t_6$), the sync condition detection logic circuit 34 clears the sync compensation counter 41, so that the count value of this counter is made equal to zero (N=0). In this condition, even if an erroneously detected sync signal is inputted outside the period of the window pulse (a time point $t_7$), the detected sync signal is rejected to pass through the hunting logic circuit 33 because the detected sync signal is inputted outside the period of the window pulse. Therefore, the sync counter 36 will not be loaded.

Conversely, if the detected sync signal which is to be inputted during the period of the window pulse is dropped out (at time point $t_8$), the sync counter will be loaded by the detection output signal of the window end detection circuit 40. Therefore, in the timing generation circuit 38, the sync signal will be generated at intervals of the synchronization without dropping out. In this state, the sync counter 36 is loaded with the corrected loading value, and the pulse width of the window pulse is corrected by the loaded value.

On the other hand, if the detected sync signal is not inputted in the window pulse, the sync compensation counter 41 is made "Count Enable", so that the count value is increased by one.

By the operation described in the foregoing, it is determined that the apparatus is in the synchronized state if the detected sync signal is regularly inputted at correct intervals. Afterwards, the sync signal can be consecutively generated at correct intervals if the detected sync signal is not dropped out several times successively as illustrated in FIG. 4F. This generation of sync signal is performed by excluding detected sync signals which are generated off the correct timing, and effecting the drop-out compensation for sync signals which are dropped-out.

In addition, by the horizontal sync compensation circuit 32, equivalent pulses generated at intervals half the intervals of vertical equivalent pulses are removed by the presence of the window pulse signal.

As explained in the foregoing, in the optical disc recording and playing apparatus according to the present invention, a video format signal is recorded on an optical disc on which pre-address-pits are previously recorded and, in playing, a synchronizing signal synchronizing signal is generated. Furthermore, sections of the video format signal corresponding to the recorded address signal are detected, and the generated synchronizing signal is outputted in place of the reproduced video format signal. Hence, although the pre-address-pits and the sync signal portions of the video format signal are recorded while overlapping with each other, the synchronizing signal with disturbances will not be outputted. In this way, a reproduced picture without any disturbances is obtained according to the present invention.

What is claimed is:

1. An optical disc recording and playing apparatus for recording a video format signal on an optical disc on which an address signal is previously recorded in the form of prepits, comprising:
   a recording means for recording said video format signal on said optical disc while controlling the rotation of said optical disc on the basis of a phase difference between a synchronizing signal in said video format signal to be recorded and said address signal read-out from said optical disc;
   a pickup means for reading-out a signal from said optical disc;
   a demodulating means for demodulating said signal read from said optical disc, and producing a reproduced video format signal;
   a synchronizing signal generating means for generating a synchronizing signal synchronized with said reproduced video format signal;
   a detecting means for detecting sections of said video format signal, each of said sections corresponding to said address signal; and
   a selecting means for alternatively outputting one of said reproduced video format signal and said synchronizing signal from said synchronizing signal generating means, said selecting means outputting said synchronizing signal from said synchronizing signal generating means only during periods corresponding to said sections of said video format signal corresponding to said address signal in response to a detection signal outputted by said detecting means.

2. An optical disc recording and playing apparatus as set forth in claim 1, wherein said synchronizing signal generating means comprises a synchronizing signal separating and compensating circuit which separates a synchronizing signal from said reproduced video format signal and effecting a drop-out compensation to the separated synchronizing signal, and said synchronizing signal generating means generates said synchronizing signal synchronized with said reproduced video format signal on the basis of an output signal of said synchronizing signal separating and compensating circuit.

3. An optical disc playing apparatus for playing an optical disc on which an address signal is previously recorded in the form of prepits and on which a video format signal is recorded while the rotation of said optical disc is controlled on the basis of a phase difference between a synchronizing signal in said video format signal to be recorded and said address signal read-out from said optical disc, said apparatus comprising:
   a pickup means for reading-out a signal from said optical disc;
   a demodulating means for demodulating said signal read from said optical disc and producing a reproduced video format signal;
   a synchronizing signal generating means for generating a synchronizing signal synchronized with said reproduced video format signal;
   a detecting means for detecting sections of said video format signal, each of said sections corresponding to said address signal; and
   a selecting means for alternatively outputting one of said reproduced video format signal and said synchronizing signal from said synchronizing signal generating means, said selecting means outputting said synchronizing signal from said synchronizing signal generating means only during periods corresponding to said sections of said video format signal corresponding to said address signal in response to a detection signal outputted by said detecting means.

4. An optical disc playing apparatus as set forth in claim 3, wherein said synchronizing signal generating means comprises a synchronizing signal separating and compensating circuit which separates a synchronizing signal from said reproduced video format signal and effecting a drop-out compensation to the separated synchronizing signal, and said synchronizing signal generating means generates said synchronizing signal synchronized with said reproduced video format signal on the basis of an output signal of said synchronizing signal separating and compensating circuit.

* * * * *